United States Patent [19]

Nguyen et al.

[11] Patent Number: 4,935,857
[45] Date of Patent: Jun. 19, 1990

[54] TRANSISTOR CONDUCTION-ANGLE CONTROL FOR A SERIES-PARALLEL RESONANT CONVERTER

[75] Inventors: Vietson M. Nguyen; John J. Dhyanchand, both of Rockford, Ill.

[73] Assignee: Sundstrand Corporation, Rockford, Ill.

[21] Appl. No.: 396,643

[22] Filed: Aug. 22, 1989

[51] Int. Cl.$^5$ ............................................. H02M 3/335
[52] U.S. Cl. ........................................ 363/17; 363/58; 363/98; 363/132
[58] Field of Search ...................... 363/17, 58, 98, 132

[56] References Cited

U.S. PATENT DOCUMENTS

| | | | |
|---|---|---|---|
| 3,953,779 | 4/1976 | Schwarz | 321/2 |
| 4,533,986 | 8/1985 | Jones | 363/17 |
| 4,549,256 | 10/1985 | Matthes et al. | 363/39 |
| 4,670,832 | 6/1987 | Park | 363/98 |
| 4,672,528 | 6/1987 | Park et al. | 363/98 |
| 4,694,383 | 9/1987 | Nguyen et al. | 363/17 |
| 4,695,933 | 9/1987 | Nguyen et al. | 363/17 |
| 4,757,432 | 7/1988 | Hancock | 363/17 |
| 4,758,940 | 7/1988 | Steigerwald | 363/98 |
| 4,791,542 | 12/1988 | Piaskowski | 363/17 |

Primary Examiner—Patrick R. Salce
Assistant Examiner—Emanuel Todd Voeltz
Attorney, Agent, or Firm—Antonelli, Terry, Stout & Kraus

[57] ABSTRACT

A DC to DC series-parallel resonant converter (10) having a plurality of switches (Q1–Q4) which are switched alternatively between on and off states to cause electrical current to flow alternatively in first and second directions through a series-resonant circuit (60) Including a variable frequency ramp generator (28) having a reset input (R) for casuing an output ramp signal produced at an output to drop to zero in response to each reset signal; a comparator (30) having an input coupled to the output of the ramp signal generator, a second input for controlling the output DC voltage of the series-parallel resonant circuit and an output which changes level each time the ramp signal reaches the magnitude of the second input; a bistable circuit (32) having first and second outputs (Q, Q̄) for respectively outputting first and second signals, the output signals changing in response to a change in the output signal of the comparator coupled to the input; a pulse generator (26), coupled to the series-parallel resonant circuit for producing an output pulse train with an output pulse occurring each time the flow of current through the series-resonant circuit changes from one of the first and second directions to another of the first and second directions, the output pulses being applied to the reset input of the variable frequency ramp generator to regulate the frequency of the output ramp signal.

23 Claims, 3 Drawing Sheets

TRANSISTOR CONDUCTION-ANGLE CONTROL FOR A SERIES-PARALLEL RESONANT CONVERTER

TECHNICAL FIELD

The present invention relates to series-parallel resonant converters. More particularly, the present invention relates to control of the switching points of transistors within series-parallel resonant converters.

BACKGROUND ART

DC to DC converters are well known which utilize an inverter to convert a DC input voltage into an intermediate AC voltage by means of a resonant circuit contained in an inverter. The AC voltage is rectified and filtered to produce a DC output voltage different than the input voltage. Typically, the inverter has a primary section and a secondary section in which the primary section includes either two (half bridge) or four power switches (full bridge) which control the flow of current through first and second conduction paths having a resonant circuit therein including a primary winding of a transformer. Examples of converters using resonant circuits are disclosed in U.S. Pat. Nos. 3,953,779, 4,549,256, 4,533,986, 4,694,383, 4,695,933, 4,757,432 and 4,758,940. The resonant circuit may be a series resonant circuit, a parallel resonant circuit or a series-parallel resonant circuit. The series resonant converter has a disadvantage that the output voltage cannot be regulated when no load is present and the output DC filter capacitor must carry a relatively high ripple current. The parallel resonant converter is able to control the output voltage when no load is present but has the disadvantage that circulating current in the power switching devices and resonant circuit components stays at a relatively constant value, independent of load, which causes efficiency to fall with a large input voltage range and variable load. The series-parallel resonant converter utilizes characteristics of both the series resonant converter and parallel resonant converter to provide no load voltage regulation and operation having a decrease in circulating current when the load resistance increases to maintain a high partial load efficiency.

DC to DC converters using series or series-parallel resonant circuits are advantageous for applications such as airframes. By choice of a relatively high resonant frequency, it is possible to provide a DC to DC converter having high output power and light weight as a consequence of the reduction in size of the inductors and capacitors when operation at high resonant frequencies occurs.

FIG. 1 illustrates a gain characteristic of a series-parallel resonant converter. The curve identified with "full load" at the maximum gain point is the response characteristic for a series-parallel resonant converter driving the maximum rated load and the curve labelled "no load" is the gain characteristic of a series-parallel resonant converter driving no load. The switching frequency of the switches within the inverter must be regulated to be above the resonant frequency. If switching of the switches within the inverter is not regulated to be above the resonant frequency of the series-parallel resonant circuit, commutation of the power diode which is in reverse parallel with the switching transistor will occur. When the power diode is connected in parallel with a power MOSFET, turn-off time of the power diode is slow which can create shoot-through in either half-bridge of full bridge converters. When operation of the series-parallel resonant circuit is above 100 kilohertz, the shoot-through current could lead to a catastrophic failure of the power transistors in a matter of seconds. As a consequence of the necessity to prevent the aforementioned shoot-through condition, series-parallel resonant converters must include circuitry to regulate the switching frequency of the power transistors to occur at a rate at all times during operation higher than the resonant frequency of the series-parallel resonant circuit. With reference to FIG. 1, it is seen that the resonant frequency fr varies as a function of load with an increase occurring as the load resistance increases. In actuality, a whole family of curves varying from full load to no load describes the actual operational characteristic of a DC to DC converter using a series-parallel resonant circuit with the resonant frequency of the series-parallel resonant circuit increasing as the load decreases. When voltage regulation is provided in which the ratio of the output voltage to the input voltage is maintained constant, it is necessary to precisely switch the power transistors within the inverter at a rate on the load characteristic curves as the load varies where the horizontal line representing a constant ratio of output voltage to input voltage intersects the curve representing the instantaneous load. As illustrated in FIG. 1, for a maximum load condition with a ratio of the DC output to input voltage K, the switching frequency of the power transistors within the inverter should be "fs1" and for a no load condition the switching frequency for the power transistors should be "fs2". If the whole family of operational curves were shown in FIG. 1, the switching frequency necessary to maintain voltage regulation wherein the output voltage to the input voltage is constant would continually increase as the electrical load resistance increases. The ratio of the resonant frequency for no load versus full load typically is approximately 3 to 1 with a DC to DC converter using a series-parallel resonant circuit.

U.S. Pat. No. 4,758,940 discloses a DC to AC resonant converter utilizing a series-parallel resonant circuit. The control of the switching frequency of the power MOSFETs therein utilizes a voltage controlled oscillator. The frequency of the voltage controlled oscillator is increased whenever current zero crossing occurs before the end of a half cycle of the output signal from the voltage controlled oscillator. The control disclosed in the 940 patent suffers from the disadvantage of complexity. Furthermore, the frequency control provided therein may be non-linear in continuous conduction modes.

The inventors of the present invention have published a paper entitled "An Implementation of Current-Mode Control for a Series-Resonant DC—DC Converter" which was read at The Applied Power Electronics Conference, San Diego, California, February, 1987 sponsored by the IEEE.

FIGS. 3 and 4 therein respectively disclose a block diagram of a series resonant converter for implementing a switching-period control and a block diagram for implementing a diode/transistor conduction angle control. The circuit of FIG. 4 is disclosed as being operational above the resonant frequency with transistor conduction angle control being usable. As a consequence of the resonant frequency of a series resonant circuit in a DC to DC converter having a constant resonant frequency, the circuits disclosed in FIGS. 3 and 4 of the above-noted publication are not usable with converters utilizing series-parallel resonant circuits in which the resonant frequency varies as a function of electrical load. In a DC to DC converter using a series resonant circuit, only the switching frequency of the power transistors is varied with the resonant frequency being constant.

DISCLOSURE OF INVENTION

The present invention provides a DC to DC converter utilizing an inverter containing a series-parallel resonant circuit for producing a regulated output voltage with the ratio of the output voltage to the input voltage being constant independent of variation of the load applied to the output voltage. With the invention control of the switching frequency of the switches within the inverter is maintained greater than the variable resonant frequency of the series-parallel resonant circuit contained within the inverter. The direction of current flow within the series-parallel resonant circuit is sensed to produce a pulse train with a pulse being produced each time the direction of current flow through the series-parallel resonant circuit changes. The pulse train keys the resetting of a variable frequency ramp generator. The output of the variable frequency ramp generator is compared to a signal controlling the output DC voltage. When the magnitude of the ramp signal becomes equal to the magnitude of the signal controlling the output DC voltage, a pulse is generated which changes the output states of a pair of outputs of a (Q and $\bar{Q}$) flip-flop controlling the conduction of the transistors within the inverter with the output states respectively controlling different transistors within the inverter to reverse the direction of current flow within the series-parallel resonant circuit. The level of the voltage controlling the output DC voltage is varied in accordance with a feedback control loop to insure that the output DC voltage has a fixed ratio with respect to the DC input voltage.

The resetting of the variable frequency ramp generator in response to the change in direction of current flow through the series-parallel resonant circuit insures that the switching frequency of the switches will not fall below the resonant frequency. If the voltage regulator were to not command a switching frequency higher than the resonant frequency, the current direction would pass through zero twice for each cycle of the resonant frequency thereby resulting in a switching frequency within the proper range.

A DC to DC series-parallel resonant converter having a plurality of switches which are switched alternatively between on and off states to cause electrical current to flow alternatively in first and second directions through a series-resonant circuit disposed between first and second reference voltages for producing a DC output voltage with the series-parallel resonant circuit having a resonant frequency varying as a function of an electrical load applied to an output of the DC to DC converter in accordance with the invention includes a variable frequency ramp generator having a reset input for causing an output ramp signal produced on an output to drop to zero in response to each reset signal; a comparator having a first input coupled to the output of the ramp generator and a second input for controlling the output DC voltage of the series-parallel resonant converter and an output which changes level each time the ramp signal reaches the magnitude of the second input, a bistable circuit having an input and first and second outputs for respectively outputting first and second output signals with the second signal being an inverse of the first signal, the output signals changing level in response to a change in level of the output signal of the comparator coupled to the input, the first and second output signals being applied to the switches to control the conductivity of the switches; a pulse generator coupled to the series-parallel resonant circuit for producing an output pulse train with an output pulse occurring each time the flow of current through the series-parallel resonant circuit changes from one of the first and second directions to another of the first and second directions, the output pulses being applied to the reset input of the variable frequency ramp generator to regulate the frequency of the output ramp signal. The second input to the comparator is generated by a circuit for generating the second signal with the second signal being proportional to and an integral of a difference between the output DC voltage and a reference DC output voltage which is a regulated DC output voltage to be produced by the converter. The pulse generator comprises a first zero crossing detector coupled to the series-parallel resonant circuit for producing a first zero crossing signal each time the direction of current flow in the series-parallel circuit changes from the first direction to the second direction; a second zero crossing detector coupled to the series resonant circuit for producing a second zero crossing signal each time the direction of current flow in the series-parallel resonant circuit changes from the second direction to the first direction; and a gate for adding the first and second zero crossing signals together to produce the pulse train. The bistable circuit may comprise a D-type flip-flop having a clock input coupled to the output of the comparator with one of the output signals coupled to a data input. The transistors preferably comprise field effect transistors which may be power MOSFETs. The converter comprises a full bridge inverter having first and second pairs of field effect transistors which are respectively in series with the series-parallel resonant circuit.

A DC to DC series-parallel resonant converter in accordance with the invention includes an inverter having two pairs of transistor switches with each switch having first, second and control terminals, each pair of the switches having a first terminal of a first switch coupled to a first reference voltage, a second terminal of a second switch coupled to a second reference voltage and a junction point of the second terminal of the first switch and the first terminal of the second switch; a series-parallel resonant circuit coupled between the junction points of the first and second pairs of switches, the resonant circuit having a resonant frequency which changes as a function of an electrical load applied to an output of the DC to DC converter; a first zero crossing detector coupled to the series-parallel resonant circuit for producing on an output a first zero crossing signal each time the direction of current flow in the series-parallel resonant circuit changes from a first direction to a second direction; a second zero crossing detector coupled to the series-parallel resonant circuit for producing on an output a second zero crossing signal each time the direction of current flow in the series-parallel resonant circuit changes from the second direction to the first direction; a bistable circuit having set, reset, data and clock inputs and two outputs respectively having opposite levels, the second output being coupled to the data input, the first output being applied to the control terminal of the first switch of the first pair of switches and the control terminal of the second switch of the second pair of switches and the second output being applied to the control terminal of the second switch of the first pair of switches and the control terminal of the first switch of the second pair of switches; a variable frequency ramp generator coupled to the outputs of the first and second detectors for producing an output ramp signal which is reset in response to each zero crossing signal; a comparator having a first input coupled to the output of the ramp signal generator, a second input to which is applied a signal for controlling an output DC voltage of the converter, and an output which changes level when the output ramp signal reaches a level of the signal applied to the second input; and a circuit, coupled to the series-parallel resonant circuit, for producing the DC output voltage for application to an electrical load. The circuit for producing a DC output voltage includes a transformer having a primary winding within the series-parallel resonant circuit and a secondary winding; a rectifier coupled to the secondary winding for producing a rectified output voltage; and a LC circuit coupled to the rectifier for producing the DC output voltage across a capacitor within the LC circuit. The signal applied to the second input is produced by a circuit for maintaining a fixed ratio of the DC output voltage to an input DC voltage independent of variation in the electrical load. The circuit for maintaining a fixed ratio includes a reference voltage source with the reference voltage being equal to a regulated DC output voltage to be produced by the converter; a circuit for generating a signal proportional to a difference between a voltage which is a function of the DC output voltage and the reference voltage; and an amplifier having an input coupled to the signal proportional to the difference and having an output which is the signal applied to the second input of the comparator. Preferably, the switches are field effect transistors which may be power MOSFETs.

BEST MODE FOR CARRYING OUT THE INVENTION

Figure 1:
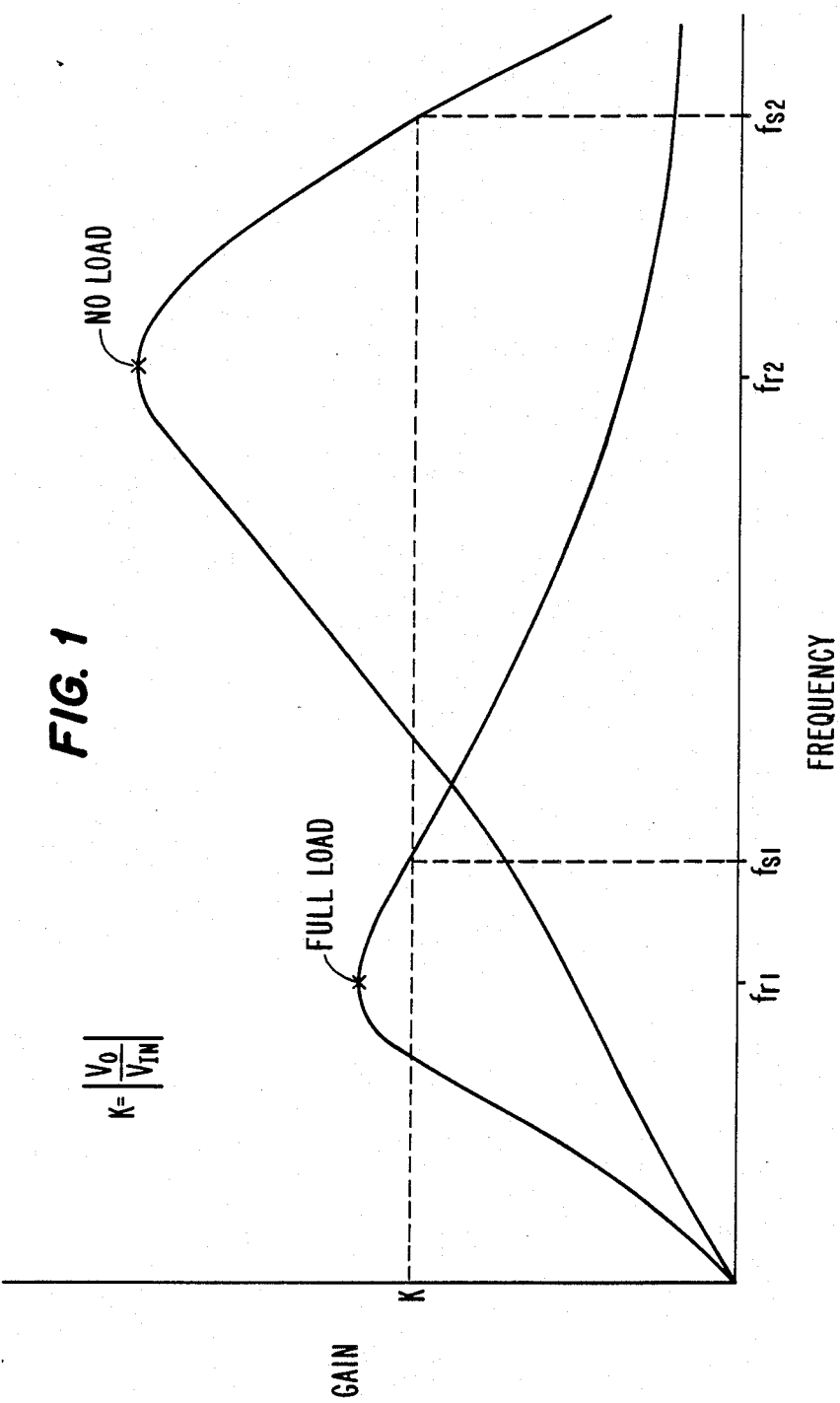
FIG. 1 illustrates the gain of a series-parallel resonant converter having a regulated output voltage.
Figure 2:
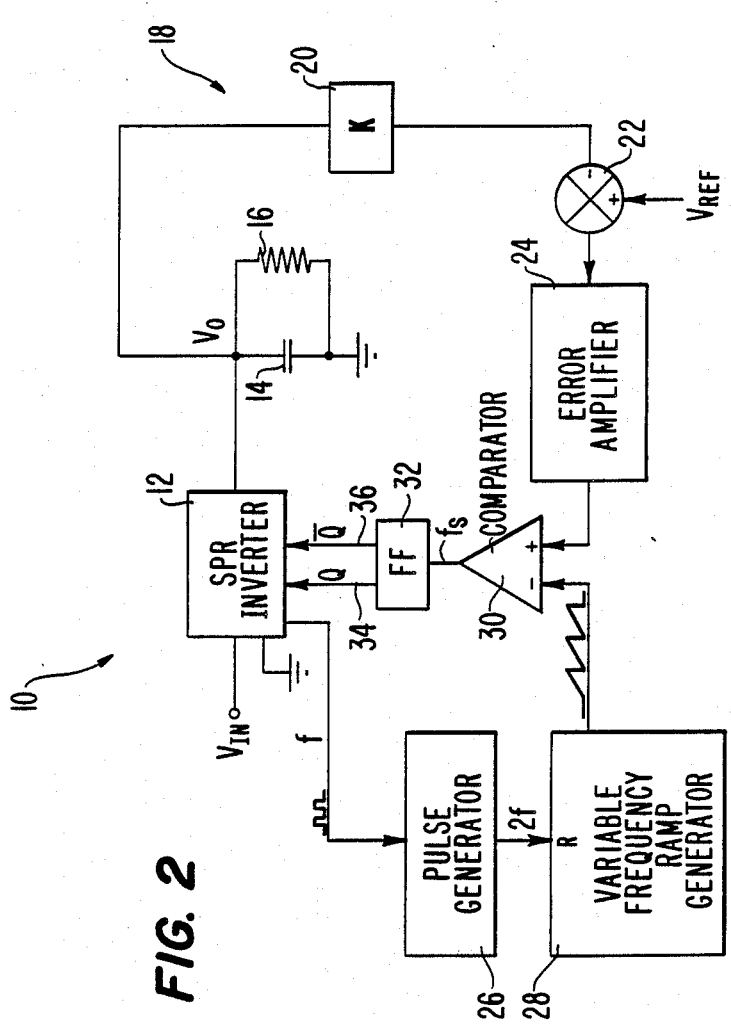
FIG. 2 a block diagram of a series-parallel resonant converter in accordance with the invention.

FIG. 2 illustrates a block diagram 10 of a series-parallel resonant converter 10 in accordance with the present invention. The series-parallel resonant converter 10 includes a series-parallel resonant inverter 12 which may be a full bridge or half bridge inverter of standard design. An example of a series-parallel resonant inverter 12 for practicing the present invention is discussed below with reference to FIG. 3. The series-parallel resonant inverter 12 functions to maintain a fixed ratio between the output voltage Vo and the input Vin as illustrated by the gain "K" in FIG. 1. The output voltage Vo is stored on capacitor 14. The electrical load 16 is illustrated as a fixed resistance but it should be understood that in actuality the load may vary which can cause the resonant frequency to vary in accordance with FIG. 1 from a no load resonant frequency to a lower resonant frequency down to a full load lowest resonant frequency as illustrated. A voltage regulation circuit 18 includes a voltage divider 20 having a gain K which produces a fixed ratio between the output voltage Vo and the input voltage Vin as illustrated in FIG. 1. A subtractor 22 produces an output error signal which is applied to error amplifier 24 which is equal to the difference between the output from the amplifier 20 and the desired regulated output voltage which is identified by "Vref". The output from the error amplifier 24 functions as a feedback signal to vary the instantaneous level of the output from the series-parallel resonant inverter 12 applied to capacitor 14 to bring the output voltage back to the desired regulated voltage Vref. A pulse generator 26 has an input coupled to the series-parallel resonant circuit, as described below in conjunction with FIG. 3, which produces an output pulse upon each change in direction of current passing through zero flowing through the series-parallel resonant circuit. The pulse generator 26 may be comprised of a positive to negative zero crossing detector and a negative to positive zero crossing detector with each detector having an input coupled to the series-parallel resonant circuit and outputs which are logically ORed together to produce an output pulse train wherein, if the frequency of the switching of the switches in the inverter is f cycles per second, the frequency of the output pulses from the pulse generator 26 is 2f cycles per second. The output from the pulse generator 26 is applied to a variable frequency ramp generator 28 which has a reset input which produces an output ramp signal of a zero level in response to each pulse outputted by the pulse generator 26. The function of the pulse generator 26 and variable frequency ramp generator 28 is to insure that the switching frequency fs as illustrated in FIG. 1 is always above the critical frequency at which switching must be maintained to avoid shoot-through as discussed above while maintaining the switching frequency at the intersection of the horizontal constant ratio gain K with the instantaneous load characteristic. The output of the variable frequency ramp generator 28 is applied to comparator 30 which changes level in response to each time the output ramp signal reaches a magnitude equal to the magnitude of the output signal from the error amplifier 24. The output signal produced by the comparator 30, which changes level in response to the level of the ramp signal outputted from the variable frequency ramp generator 28 reaching the level of the output signal from the error amplifier 24, is used to change the state of flip-flop 32 which has first and second outputs 34 and 36 respectively having opposite levels which are applied to the control electrodes of the transistor switches within the series-parallel resonant inverter 12 in conventional fashion. The embodiment of FIG. 2 is less complex than DC to DC converters using voltage controlled oscillators as described above with respect to the prior art and produces reliable switching of the switches with the series-parallel resonant inverter 12 in accordance with the switching frequency illustrated in FIG. 1 to maintain a constant ratio between the output voltage Vo and the input voltage Vin as identified by the gain K in FIG. 1. The combination of the pulse generator 26 and variable frequency ramp generator 28 insures that the switches within the series-parallel resonant 12 inverter will always be switched at a frequency equal to or greater than the resonant frequency avoiding switching at a frequency which could result in damage or failure of the inverter.

Figure 3:
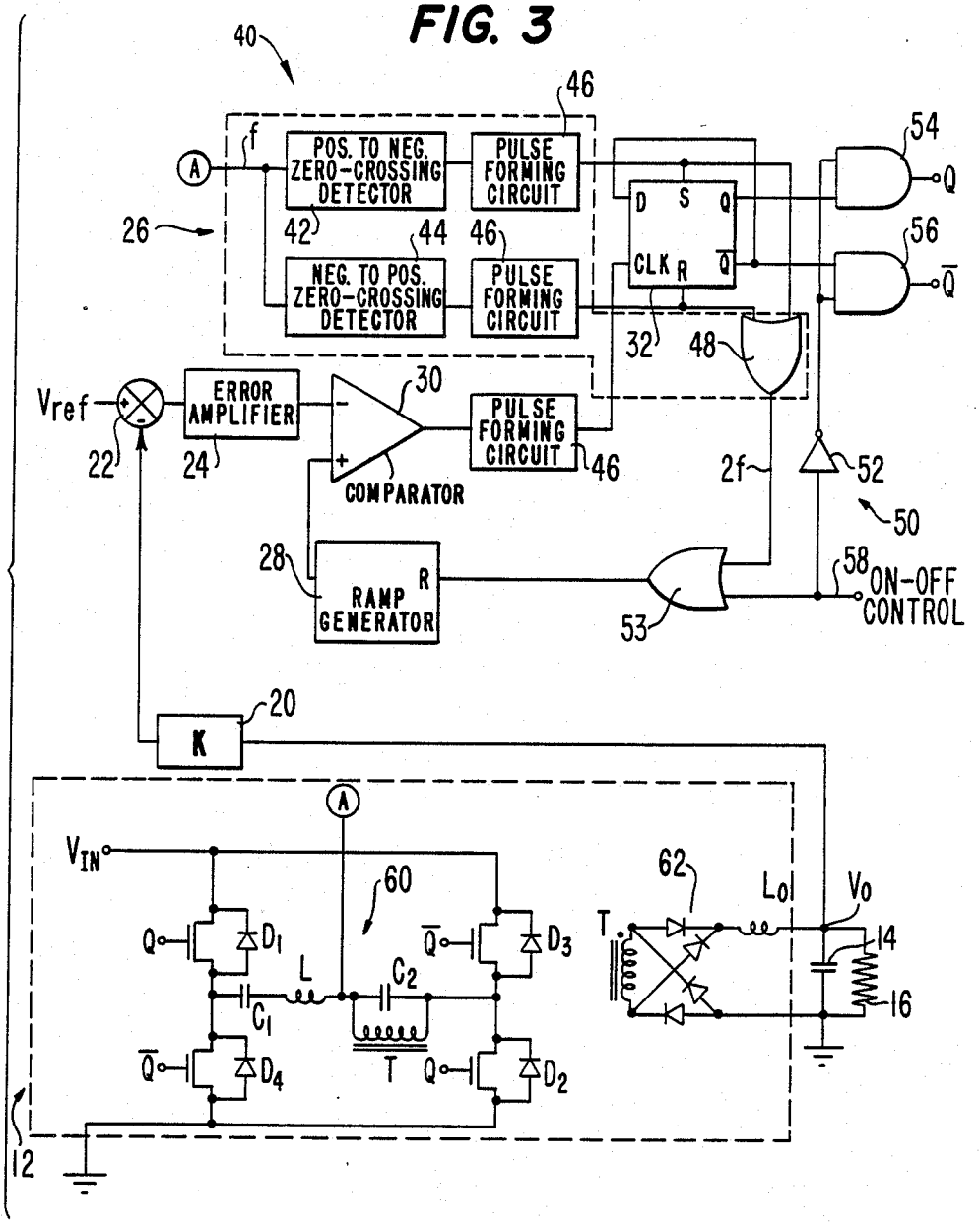
FIG. 3 illustrates a detailed block diagram of an embodiment of a series-parallel resonant converter in accordance with the invention.

FIG. 3 illustrates a detailed block diagram of a preferred embodiment 40 of a series-parallel resonant converter in accordance with the present invention. Like reference numerals identify like parts in FIGS. 2 and 3. The series-parallel resonant inverter 12 is of conventional design. Preferably, the transistor switches are power MOSFETs. The series-parallel resonant circuit contains a series resonant circuit comprised of capacitor C1 and inductor L and a parallel resonant circuit comprised of capacitor C2 and the inductance of the primary of transformer T. The MOSFET transistor switches Q and $\overline{Q}$ each have a body diode fabricated into the substrate in accordance with conventional processes. The body diodes are D1-D4. The secondary of the transformer is connected to a full wave rectifier 62 of conventional construction which outputs pulsating DC to an LC filter comprised of inductor Lo in capacitor 14. As illustrated, the level of current direction flow is sensed at the junction between inductor L and the parallel combination of capacitor C2 and the primary of transformer T which is applied to the pulse generator 26. Furthermore, it should be understood that the present invention may be practiced with a half-bridge inverter. The pulse generator 26 is comprised of a positive to negative zero crossing detector 42 and a negative to positive zero crossing detector 44 of conventional design which are respectively coupled to pulse forming circuits 46 that may be astable multivibrators or other circuits producing a pulse in response to a change in direction of currents sensed by the positive to negative or negative to positive zero crossing detectors and OR gate 48 which sums the output pulses produced by the pulse forming circuits 46. The positive to negative zero crossing detector 42 produces an output signal each time the current flow through the series-parallel resonant circuit changes from a first direction to a second direction and the negative to positive zero crossing detector 44 produces an output signal each time the current flow through the series-parallel resonant circuit changes from the second direction to the first direction. An on/off control circuit 50, which is comprised of inverter 52, OR gate 53, and AND gates 54 and 56 controls the output of the switching signals Q and $\overline{Q}$ of the transistor switches in the series-parallel resonant inverter 12. When the input signal on line 58 is high, which signifies that the converter is to be turned off, the inverter 52 causes a low level signal to be applied to the inputs of AND gates 54 and 56 which blocks the outputting of Q and $\overline{Q}$ to the control electrodes of the transistor switches and also resets the ramp generator 28. Furthermore, the output of comparator 30 is supplied to a pulse forming circuit 46 to produce a clock signal applied to the clock input of D-type flip-flop 32 which has the $\overline{Q}$ output applied to the data input to cause the level of the output signals Q and $\overline{Q}$ to change each time the clock signal is applied from the pulse forming circuit 46 in response to the level of the ramp generator reaching the level of the signal applied by the error amplifier 24 to the comparator 30.

While the invention has been described in terms of its preferred embodiment, it should be understood that numerous modifications may be made thereto without departing from the spirit and scope of the invention as defined in the appended claims. It is intended that all such modifications falls within the scope of the appended claims.

I claim:

1. A DC to DC series-parallel resonant converter comprising:
   an inverter having two pairs of transistor switches with each switch having first, second and control terminals, each pair of the switches having a first terminal of a first switch coupled to a first reference voltage, a second terminal of a second switch coupled to a second reference voltage and junction point of the second terminal of the first switch and the first terminal of the second switch;
   a series-parallel resonant circuit coupled between the junction points of the first and second pairs of switches; the resonant circuit having a resonant frequency which changes as a function of an electrical load applied to an output voltage of the DC to DC converter;
   a first zero crossing detector coupled to the series-parallel resonant circuit for producing on an output a first zero crossing signal each time the direction of current flow in the series-parallel resonant circuit changes from a first direction to a second direction;
   a second zero crossing detector coupled to the series-parallel resonant circuit for producing on an output a second zero crossing signal each time the direction of circuit flow in the series-parallel resonant circuit changes from the second direction to the first direction;
   a bistable circuit having set, reset, data and clock inputs and two outputs respectively having opposite levels, an output being coupled to the data input, the first output being applied to the control terminal of the first switch of the first pair of switches and to the control terminal of the second switch of the second pair of switches and the second output being applied to the control terminal of the second switch of the first pair of switches and the control terminal of the first switch of the second pair of switches;
   a variable frequency ramp generator, coupled to the output of the first and second detectors, for producing on an output an output ramp signal which is reset to a zero level in response to each zero crossing signal;
   a comparator having a first input coupled to the output of the ramp signal generator and a second input to which is applied a signal for controlling an output DC voltage of the converter and an output, which changes level when the output ramp signal reaches a level of the signal applied to the second input coupled to the clock input; and
   means, coupled to the series-parallel resonant circuit for producing the DC output voltage for application to an electrical load.

2. A DC to DC converter in accordance with claim 1 wherein the means for producing the DC output voltage comprises:
   a transformer having a primary winding within the series-parallel resonant circuit and a secondary winding;
   a rectifying means coupled to the secondary winding for producing a rectified output voltage; and
   an LC circuit coupled to the rectifying means for producing the DC output voltage across a capacitor within the LC circuit.

3. A DC to DC converter in accordance with claim 1 wherein:
   the signal applied to the second input is produced by a means for maintaining a fixed ratio of the DC output voltage to an input DC voltage independent of variation in the electrical load.

4. A DC to DC converter in accordance with claim 3 wherein the means for maintaining a fixed ratio comprises:
   a reference voltage source with the reference voltage being a regulated DC output voltage to be produced by the converter;
   means for generating a signal proportional to a difference between a voltage which is a function of the DC output voltage and the reference voltage; and
   an amplifier having an input coupled to the signal proportional to the difference and having an output which is the signal applied to the second input of the comparator.

5. A DC to DC converter in accordance with claim 4 wherein:
   the switches are field effect transistors.

6. A DC to DC converter in accordance with claim 2 wherein:
   the signal applied to the second input is produced by a means for maintaining a fixed ratio of the DC output voltage to an input DC voltage independent of variation in the electrical load.

7. A DC to DC converter in accordance with claim 6 wherein the means for maintaining a fixed ratio comprises:
   a reference voltage source with the reference voltage being equal to a regulated DC output voltage to be produced by the converter;
   means for generating a signal proportional to a difference between a voltage which is a function of the DC output voltage and the reference voltage; and
   an amplifier having an input coupled to the signal proportional to the difference and having an output which is the signal applied to the second input of the comparator.

8. A DC to DC converter in accordance with claim 7 wherein:
   the switches are field effect transistors.

9. A DC to DC converter in accordance with claim 1 wherein:
   the switches are field effect transistors.

10. A DC to DC converter in accordance with claim 2 wherein:
    the switches are field effect transistors.

11. A DC to DC converter in accordance with claim 3 wherein:
    the transistors are field effect transistors.

12. A DC to DC series-parallel resonant converter having a plurality of switches which are switched alternatively between on and off states to cause electrical current to flow alternatively in first and second directions through a series-resonant circuit disposed between first and second reference voltages for producing an output DC voltage with the series-parallel resonant circuit having a resonant frequency varying as a function of an electrical load applied to an output of the DC to DC converter comprising:
    a variable frequency ramp generator having a reset input for causing an output ramp signal produced at an output to drop to zero in response to each reset signal;
    a comparator, having a first input coupled to the output of the ramp signal generator and a second input, for controlling the output DC voltage of the series-parallel resonant circuit and an output which changes level each time the ramp signal reaches the magnitude of the second input;
    a bistable circuit having an input and first and second outputs for respectively outputting first and second output signals with the second signal being an inverse of the first signal, the output signals changing in response to a change in the output signal of the comparator coupled to the input, the first and second output signals being applied to the switches to control the conductivity of the switches; and
    a pulse generator coupled to the series-parallel resonant circuit for producing an output pulse train with an output pulse occurring each time the flow of current through the series-parallel resonant circuit changes from one of the first and second directions to another of the first and second directions, the output pulses being applied to the reset input of the variable frequency ramp generator to regulate the frequency of the output ramp signal.

13. A DC to DC converter in accordance with claim 12 wherein the second input is generated by signal generating means comprising:
    means for outputting the second signal, the second signal being proportional to a difference between the output DC voltage and a reference DC output voltage to be produced by the converter.

14. A DC to DC converter in accordance with claim 13 wherein the pulse generator comprises:
    a first zero crossing detector, coupled to the series-parallel resonant circuit, for producing a first zero crossing signal each time the direction of current flow in the series-parallel circuit changes from the first direction to a second direction;
    a second zero crossing detector, coupled to the series resonant circuit, for producing a second zero crossing signal each time the direction of current flow in the series-parallel resonant circuit changes from the second direction to the first direction; and
    means for combining the first and second zero crossing signals together to produce the pulse train.

15. A DC to DC converter in accordance with claim 14 wherein the bistable circuit comprises:
    a flip-flop having a clock input coupled to the output of the comparator with one of the output signals coupled to a data input.

16. A DC to DC converter in accordance with claim 12 wherein the switches comprise:
    field effect transistors.

17. A DC to DC converter in accordance with claim 16 wherein the converter further comprises:
    a full bridge inverter having first and second pairs of field effect transistors, each pair of transistors having a junction coupled to the series-parallel resonant circuit.

18. A DC to DC converter in accordance with claim 13 wherein the switches comprise:
    field effect transistors.

19. A DC to DC converter in accordance with claim 18 wherein the converter further comprises:
    a full bridge inverter having first and second pairs of field effect transistors, each pair of transistors having a junction coupled to the series-parallel resonant circuit.

20. A DC to DC converter in accordance with claim 14 wherein the switches comprise:
    field effect transistors.

21. A DC to DC converter in accordance with claim 20 wherein the converter further comprises:
    a full bridge inverter having first and second pairs of field effect transistors, each pair of transistors having a junction coupled to the series-parallel resonant circuit.

22. A DC to DC converter in accordance with claim 15 wherein the switches comprise:
field effect transistors.

23. A DC to DC converter in accordance with claim 22 wherein the converter further comprises:
a full bridge inverter having first and second pairs of field effect transistors, each pair of transistors having a junction coupled to the series-parallel resonant circuit.

* * * * *